United States Patent Office 2,898,316
Patented Aug. 4, 1959

2,898,316

COMPOSITION COMPRISING AN OXYGEN-CONTAINING POLYMER OF CYCLOPENTADIENE AND WAX

Otto Roelen, Oberhausen-Holten, Germany, assignor to Ruhrchemie Aktiengesellschaft, Oberhausen-Holten, Germany, a corporation of Germany No Drawing. Application November 24, 1953
Serial No. 394,193

Claims priority, application Germany December 1, 1952

4 Claims. (Cl. 260—28.5)

This invention relates to, and has as an object, commercial wax materials.

The term "commercial wax materials," as used herein, is intended to designate wax-like materials commercially designated or used as waxes, as, for example, for coating, polishing, impregnating, etc.

It is well known that the so-called hard paraffins obtained from carbon monoxide and hydrogen in the Fischer-Tropsch synthesis may be used as waxes. Although hard paraffins melting at a temperature as high as 140° C. can be synthesized, most of the hard paraffin waxes have melting points not substantially exceeding 100° C.

The naturally occurring waxes, i.e., the high-molecular esters derived from long-chain alcohols and long-chain fatty acids, also melt at comparatively low temperatures.

It has now been found that the polymerization products of cyclopentadiene, having the structure of condensed 5-membered carbon rings, constitute waxes of outstanding qualities.

The waxes in accordance with the present invention are obtained by polymerizing cyclopentadiene or its low-molecular polymers and recovering a polymerisation product of cyclopentadiene having the structure of condensed 5-membered carbon rings. The cyclopentadiene can be polymerized by heating to a temperature of about 150–250° C. under elevated pressure. The polymerization of cyclopentadiene can also be effected with the aid of catalysts. The polymerization of cyclopentadiene may be effected in the liquid or gaseous phase.

According to the invention, the polymerization products of cyclopentadiene can be used as such or after a preliminary hydrogenation in which the double bonds of the two outer cyclopentadiene rings of the molecules are saturated.

Depending upon the degree of polymerization and saturation, the waxes in accordance with the invention have different properties. Among the unsaturated cyclopentadiene polymers, those containing 4 or more condensed 5-membered rings exhibit satisfactory wax properties, whereas, among the saturated polymers, even the dimer melting at 77° C. can be used as a wax or a wax component.

The waxes provided by the present invention comply with all technical requirements for commercial wax materials. They are kneadable at 20° C., solid to brittle-hard, microcrystalline and opaque, but not glass-like. They melt without decomposition and are of relatively low viscosity and not stringy at a temperature slightly in excess of the melting point. Moreover, they are capable of being polished under a slight pressure.

Since the polymerization of cyclopentadiene can be accomplished in such a manner as to produce a wide variety of polymerization products differing from each other in the degree of polymerization, the present invention makes it possible to produce waxes of any desired melting point. Thus, waxes melting in the range within 150–300° C. have become available for the first time.

Although the waxes in accordance with the invention are generally used in the form of mixtures of cyclopentadiene polymers containing a different number of cyclopentadiene units, individual cyclopentadiene polymers obtained by separating the crude polymerization product into fractions of different polymerization degree may offer certain advantages for special purposes. The separation of the crude polymerization products can be performed by the conventional methods for separating mixtures of polymerhomologous compounds, for example, by fractional vacuum distillation or selective extraction. Thus, the pentamer of cyclopentadiene can be isolated. After hydrogenation of its double bonds, a product melting at a temperature as high as 310° C., which is extremely useful for increasing the melting point of wax compositions, can be obtained.

The waxes in accordance with the invention can be mixed with other waxes, which results either in an increase or a decrease of the melting point, depending on the nature of the admixed product and the ratio of the components.

The waxes in accordance with the invention are generally well compatible with other waxes of natural or synthetic origin. Therefore, various mixtures with other waxes may be prepared, thus producing formulations having novel properties and, in particular, higher melting points. The hydrocarbon waxes in accordance with the invention are particularly compatible with the solid paraffins produced by the catalytic hydrogenation of carbon monoxide. They may be melted together with these hydrocarbons in certain quantitatives proportions to form uniform wax materials. In this way, there may be produced hydrocarbon waxes of any melting point within the broad range between the melting point of the slabbed paraffins, i.e., about 50°–60° C. on the one hand, and melting points far in excess of 200° C. on the other.

The properties of the wax materials in accordance with the invention may also be varied and adapted to the commercial requirements by adding to the double bonds of the unsaturated primary polymers of cyclopentadiene, instead of hydrogen, other groups, especially those which contain oxygen or nitrogen, as, for example, water, formic acid, hydrocyanic acid, etc. It is also possible to add carbon monoxide and hydrogen by means of the Oxo synthesis in the presence of cobalt catalysts, thereby obtaining aldehydes or alcohols, which have the structure of condensed 5-membered rings with one or two methylal or methylol groups attached to the outer rings. These compounds may as such be used as wax materials or prior to their use be converted into the corresponding carboxylic acids or esters. In this way there are obtained wax materials which, in addition to their general outstanding wax properties, are particularly useful because their melting points lie far above 100° C.

The waxes in accordance with the invention and the mixtures thereof with other wax-like materials may be used for the production of coatings for paper and fabrics, of polishing waxes, leather dressings, auxiliary materials for electrical engineering, etc.

The following examples are given by way of illustration and not limitation:

EXAMPLE 1

*Heat polymerization of dicyclopentadiene*

For the production of hydrocarbons having the structure of 5-membered carbon rings, batches of 1000 grams dicyclopentadiene each are treated for 1 to 30 hours at temperatures of 170–240° C. in a shaking autoclave. For processing, the reaction products are dissolved with about four times their weight of hydrogenated hydrocarbon (especially those having 9 and 10 carbon atoms in the molecule) and separated from the undissolved portions by hot filtration. The residue represents a product which has a melting point of above 320° C. and has been designated as polycyclopentadiene. This is a mixture of hexa-, hepta- and higher polymerized products. The filtrate is subsequently cooled and the precipitated portions are filtered off. The product thus obtained has a melting point of 250°–270° C. and consists chiefly of pentacyclopentadiene. The second filtrate is then subjected to vacuum distillation which leaves a residue which has a melting point of 110°–130° C. This product is a mixture of tricyclopentadiene and tetracyclopentadiene. The unconverted dicyclopentadiene distils over with the top product. Therefore, the quantity of dicyclopentadiene may be computed from the difference between the feed product and the finished products formed.

The following results were obtained in an experiment carried out in this way with the use of dicyclopentadiene:

TABLE 1.—POLYMERIZATION OF DICYCLOPENTADIENE WITHOUT THE USE OF A DILUTING AGENT

| Temperature, ° C. | 190 | 190 | 190 | 195 | 200 |
|---|---|---|---|---|---|
| Time, hrs | 20 | 10 | 5 | 10 | 10 |
| Percentage of: | | | | | |
| polycyclopentadiene | 12 | 12 | 4 | 11 | 20 |
| pentacyclopentadiene | 17 | 28 | 17 | 20 | 10 |
| tricyclopentadiene + tetracyclopentadiene | 42 | 24 | 41 | 34 | 40 |
| dicyclopentadiene | 29 | 36 | 39 | 35 | 30 |
| average of experiments | 9 | 3 | 1 | 2 | 1 |

A comparison of these experimental results shows that in all of these polymerizations pentacyclopentadiene has been obtained in a relatively small amount. If the polymerization product is heated to 190° C. and the action of heat is continued for 10 hours, about 25% pentacyclopentadiene are obtained. In addition, considerable quantities of tricyclopentadiene and tetracyclopentadiene are formed in all of the experiments. With heating periods of 5–20 hours, the yields of pentacyclopentadiene decrease. A decrease in the yield of pentacyclopentadiene is also effected by an increase in the temperature to 200° C. The polymerization carried out at 200° C. results in a finished product which has a softening point in excess of 200° C. Therefore, this product solidifies already in the shaking autoclave during the experiment and easily causes local superheating which results in a partial carbonization of the polymerisate.

EXAMPLE 2

*Polymerization of dicyclopentadiene with the addition of tricyclopentadiene and tetracyclopentadiene*

As may be seen from the preceding example, the portion of tricyclopentadiene and tetracyclopentadiene formed in the polymerization product is generally the highest. In order to increase the yield of pentacyclopentadiene, it is attemtped therefore, to cleave the tricyclopentadiene and tetracyclopentadiene or to directly add it as such to the polymerization. An attempt to distil the mixture of tricyclopentadiene and tetracyclopentadiene at normal pressure shows that it is possible with the addition of iron turnings to cleave about 50% of the feedstock to produce mono- and dicyclopentadiene. When using tricyclopentadiene and tetracyclopentadiene as the starting mixture and treating the mixture in the shaking autoclave for 20 hours at 190° C., the following products may be isolated after the usual processing:

12% polycyclopentadiene
4% pentacyclopentadiene
65% tricyclopentadiene and tetracyclopentadiene
19% dicyclopentadiene Based on these results, polymerizations of dicyclopentadiene were effected with the addition of tricyclopentadiene and tetracyclopentadiene in a mixing proportion of 2:1 (content of tricyclopentadiene and tetracyclopentadiene in the starting product 33%). The results are listed in the following table:

TABLE 2

| Temperature, ° C. | 170 | 180 | 180 | 185 | 185 | 185 | 190 | 220 | 220 | 220 | 220 |
|---|---|---|---|---|---|---|---|---|---|---|---|
| Time, hrs | 20 | 20 | 10 | 20 | 10 | 5 | 20 | 10 | 6 | 2 | 1 |
| Percentage of: | | | | | | | | | | | |
| polycyclopentadiene | 2 | 15 | 14 | 12 | 18 | 6 | 58 | 78 | 27 | 12 | 6 |
| pentacyclopentadiene | 11 | 23 | 17 | 17 | 20 | 14 | 2 | 1 | 6 | 19 | 12 |
| tricyclopentadiene + tetracyclopentadiene | 45 | 23 | 22 | 27 | 29 | 32 | 30 | 10 | 19 | 16 | 35 |
| dicyclopentadiene | 42 | 39 | 47 | 44 | 33 | 48 | 10 | 11 | 48 | 53 | 47 |
| average of experiments | 1 | 3 | 1 | 1 | 19 | 1 | 1 | 1 | 1 | 1 | 1 |

A comparison with the corresponding experiments carried out without the addition of tricyclopentadiene and tetracyclopentadiene shows that the addition of the latter does not result in an increased yield of tricyclopentadiene and tetracyclopentadiene in the processed products, but that, in the contrary, the quantity of tricyclopentadiene and tetracyclopentadiene present has even somewhat decreased. It can further be stated that the total of polycyclopentadiene and pentacyclopentadiene is increased as compared with the corresponding polymerizations effected without the addition of tricyclopentadiene and tetracyclopentadiene. At temperatures of 190° C. and higher, the polymerization proceeds to a preponderant extent towards the formation of polycyclopentadiene and pentacyclopentadiene. By decreasing the reaction temperature, this extensive polymerization may be reduced on the expense of the total conversion.

EXAMPLE 3

*Hydrogenation of the polymerization products of dicyclopentadiene*

The total finished products of the polymerization experiments effected at 190° C. and with a reaction time of 10 hours are charged to the hydrogenation. This hydrogenation is partially effected with diluents ($C_9$ hydrocarbons) and partially in the undiluted state since at 140° C. the finished products of the polymerization are already of liquid or paste-like condition. The hydrogenations are effected in an autoclave with the use of nickel-magnesia catalysts. The autoclave is constructed of iron or copper. The results are shown in the following table:

TABLE 3

| Temperature, ° C. | Diluting ratio | Feedstock | Autoclave constructed of— | Percent hydrogenated pentacyclopentadiene |
|---|---|---|---|---|
| 100 | 1:1 | end product | Fe | 22 |
| 140 | 2:1 | do | Fe | 18 |
| 140 | 1:0 | do | Fe | 19 |
| 140 | 1:0 | do | Cu | 17 |

Thus, about 20% of the total product may be converted into hydrogenated pentacyclopentadiene with the simultaneous formation of about 20% hydrogenated polycyclopentadiene, 40% hydrogenated tricyclopentadiene+hydrogenated tetracyclopentadiene and 20% hydrogenated dicyclopentadiene.

When starting the hydrogenation with one of the polymerization products according to Example 1 or 2, such as pentacyclopentadiene, in the hydrogenation of which a solvent must be present, a considerable cleavage of the starting product occurs. The following results are obtained with the use of nickel-magnesia catalysts:

TABLE 4.—HYDROGENATION OF PENTACYCLOPENTADIENE

| Temperature °C. | Diluent | Diluting ratio | Autoclave constructed of— | Percent hydrogenated pentacyclopentadiene |
|---|---|---|---|---|
| 220 | $C_{10}$ | 1:2 | Fe | 26 |
| 140 | hydrogenated dicyclopentadiene. | 1:3 | Fe | 25 |
| 140 | monocyclopentadiene+ hydrogenated dicyclopentadiene. | 1:3 | Cu | 16 |
| 140 | $C_{10}$ | 1:4 | Cu | 40 |
| 140 | $C_7$ | 1:1 | Fe | 32 |
| 100 | $C_{10}$ | 1:1 | Cu | 45 |
| 180 | $C_{10}$ | 1:1 | Fe | 36 |
| 80 | $C_7$ | 1:1 | Fe | 26 |

The processing of the products is effected in the same manner as described in Example 1. The hydrogenation catalyst remains mixed with the hydrogenated polycyclopentadiene. As may be seen from the table, only relatively small amounts of hydogenated pentacyclopentadiene having a melting point of 280–290° C. are obtained. The yield of the desirable product is variable. The kind of solvent, the quantity of solvent and the material of the autoclave exert a decisive influence on the composition of the product.

The temperature seems to have a lesser influence. Higher temperatures accelerate the cleavage as well as the hydrogenation. Hydrogenated products, however, are stable and are thus withheld from the further cleavage so that the over-all result appears to be relatively independent on the temperature. The yield of hydrogenated pentacyclopentadiene is low even at a temperature of 80° C.

The best results are obtained in an autoclave with a Cu insertion. In this case, with the use of $C_{10}$ as the diluent, 40 and 45% of hydrogenated pentacyclopentadiene are obtained. An experiment carried out in the same autoclave using a mixture of hydrogenated mono- and dicyclopentadiene as the solvent showed a particularly extensive cleavage. This mixture can be considered to be a relatively good solvent. Obviously, just the conditions which effect a good dissolution of the pentacyclopentadiene favor the cleavage in the hydrogenation. The cleavage is also influenced by the presence of iron. The best yields of hydrogenated pentacyclopentadiene (45%) have been obtained in a copper autoclave with a diluting ratio of 1:1 and with the use of $C_{10}$ hydrocarbon which is a solvent of medium dissolving properties.

The presence of the Ni—MgO catalysts seems to have no effect on the cleavage of the products. In contrast, a high cleavage was observed in an experiment effected in an iron autoclave in which pentacyclopentadiene, diluted with $C_{10}$ hydrocarbon in a ratio of 1:2, was maintained for several hours under hydrogen pressure at 140° C. in the absence of a catalyst. In this case, the following composition of the finished product was found after processing with $C_{10}$ hydrocarbon:

34% polycyclopentadiene
24% pentacyclopentadiene
42% tricyclopentadiene+tetracyclopentadiene

EXAMPLE 4

*Heat polymerization of dicyclopentadiene in the presence of a solvent*

Polymerizations of dicyclopentadiene were carried out in the presence of $C_{10}$ hydrocarbon as the solvent. The following table shows the results obtained in these experiments:

TABLE 5

| Temperature, °C | 190 | 220 | 220 | 240 | 240 |
|---|---|---|---|---|---|
| Time, hrs | 20 | 20 | 12 | 10 | 10 |
| Percentage of: | | | | | |
| polycyclopentadiene | 7 | 4 | 3 | 1 | 0 |
| pentacyclopentadiene | 18 | 7 | 8 | 2 | 0 |
| tricyclopentadiene+tetracyclopentadiene | 49 | 49 | 79 | 84 | 34 |
| dicyclopentadiene | 26 | 40 | 16 | 13 | 66 |
| solvent | $C_{10}$ | $C_{10}$ | $C_{10}$ | $C_{10}$ | $C_9$ |
| Average of experiments | 2 | 1 | 1 | 2 | 2 |

A comparison of the experiments carried out at 190° C. and for 20 hours with those effected without the use of a solvent shows that the dilution results in a decreased formation of higher polymers in favor of the lower polymerisates. This effect is considerably increased by increasing the temperature so that, at temperatures of 240° C., practically no polycyclopentadiene and pentacyclopentadiene is finally formed. In these cases, tricyclopentadiene and tetracyclopentadiene must be considered to be the highest polymerisates. The two experiments carried out at 240° C. with the use of hydrocarbons of different carbon numbers as the diluents show the substantial influence of the solvent on the degree of polymerization.

The composition of the reaction products may be influenced by adding the individual polymerization products to the starting product. The polymerization of a mixture consisting of 18% polycyclopentadiene, 41% dicyclopentadiene and 41% tricyclopentadiene+tetracyclopentadiene with the addition of 4 parts of $C_{10}$ hydrocarbon for each part of starting product gave the results listed in the following Table 6:

TABLE 6

| Temperature, °C | 160 | 170 | 180 | 180 | 190 | 190 | 220 |
|---|---|---|---|---|---|---|---|
| Time, hrs | 20 | 20 | 10 | 20 | 10 | 20 | 10 |
| Percentage of: | | | | | | | |
| polycyclopentadiene | 16 | 15 | 12 | 13 | 11 | 18 | 13 |
| pentacyclopentadiene | 4 | 6 | 3 | 8 | 7 | 10 | 6 |
| tricyclopentadiene+tetracyclopentadiene | 38 | 37 | 50 | 46 | 48 | 48 | 62 |
| dicyclopentadiene | 43 | 42 | 35 | 33 | 34 | 24 | 19 |
| Average of experiments | 2 | 2 | 2 | 2 | 2 | 4 | 1 |

As may be seen, the yields of polycyclopentadiene found are in the range of or below 18% which means that not only no new polycyclopentadiene has been formed, but that the polycyclopentadiene charged with the starting mixture has partially been cleaved to form lower polymerisates.

The production of pentacyclopentadiene may be effected in continuous operation by charging to the polymerization the polycyclopentadiene filtered off in the processing, in addition to tricyclopentadiene and tetracyclopentadiene, with the addition of fresh dicyclopentadiene. This results in the following portions of pentacyclopentadiene (temperature, 180° C.; reaction time, 20 hours):

| Run No.: | Percent pentacyclopentadiene |
|---|---|
| 1 | 6.8 |
| 2 | 6.8 |
| 3 | 6.0 |
| 4 | 4.4 |
| 5 | 3.2 |
| 6 | 4.4 |

Mixtures of pentacyclopentadiene and paraffin having the following softening points and melting ranges were produced:

| | Softening point, °C. | Melting range, °C. |
|---|---|---|
| 90% paraffin, B.P. above 380° C. 10% pentacyclopentadiene | 167 | 85–180 |
| 80% paraffin, B.P. above 380° C. 20% pentacyclopentadiene | 210 | 90–270 |
| 70% paraffin, B.P. above 380° C. 30% pentacyclopentadiene | 240 | 95–280 |

By hydrogenating a starting product which, by distillation, has been enriched with pentacyclopentadiene, no increased yields of hydrogenated pentacyclopentadiene are obtained, but a renewed adjustment to equilibrium to the low molecular products takes place in the hydrogenation with the use of $C_{10}$ hydrocarbon as the diluent, as may be seen from the following two hydrogenation experiments:

TABLE 7

| Temperature, °C. | Diluting ratio | Feedstock | Autoclave constructed of— | Percent hydrogenated pentacyclopentadiene |
|---|---|---|---|---|
| 100 | 1:1 | residue from distillation. | Cu | 18 |
| 140 | 1:0.3 | ----do---- | Fe | 26 |

The hydrogenated products obtained have the following melting points:

Degrees C.
Hydrogenated dicyclopentadiene _____ 77
Hydrogenated tricyclopentadiene _____ 28–32
Hydrogenated tetracyclopentadiene _____ 120–140
Hydrogenated pentacyclopentadiene _____ 290–310

Hydrogenated dicyclopentadiene is a crystallized substance while hydrogenated tricyclopentadiene and hydrogenated tetracyclopentadiene are of wax-like character and hydrogenated pentacyclopentadiene represents a white powder. All of the products except for the hydrogenated polycyclopentadiene are miscible by fusion with paraffin and other waxes. In mixing with slabbed paraffin, there was found that hydrogenated dicyclopentadiene and hydrogenated tricyclopentadiene, when contained in amount of as much as 50% in the mixture, decrease the pour point while with higher percentages, in the case of hydrogenated dicyclopentadiene, the pour point increases to as high as 77° C. and, in the case of hydrogenated tricyclopentadiene, drops to about 30° C. Hydrogenated tetracyclopentadiene, when contained in the mixtures in amount of as high as about 30%, decreases also the pour point and increases it only to as high as 120°–140° C. with the further addition. Hydrogenated pentacyclopentadiene, as contrasted to hydrogenated dicyclopentadiene, tricyclopentadiene and tetracyclopentadiene, surprisingly shows a different behavior. Even additions of as little as a few percent greatly increase the pour point. After the addition of 10% hydrogenated pentacyclopentadiene, both slabbed paraffins and hard paraffins showed pour points of about 180° C. With 20% hydrogenated pentacyclopentadiene, the pour point increases to about 230° C. and with 30% to about 260° C. The addition of higher percentages is not practicable. This substantial increase in the pour point was also observed with all of the waxes investigated, such as with beeswax, carnauba wax, all of the Gersthofen waxes, wax alcohols and wax acids. Thus, hydrogenated pentacyclopentadiene represents a substance which substantially increases the pour point of all waxes investigated up to the present. Waxes with pure hydrogenated pentacyclopentadiene admixed thereto show no effluorescence.

When mixing hard paraffin and slabbed paraffin, respectively, with hydrogenated pentacyclopentadiene, no substantial change of the flexibility and penetration number of the starting paraffin occurs. With mixtures of hard paraffin, slabbed paraffin and hydrogenated pentacyclopentadiene, the same effects may be obtained as those obtained with mixtures of either hard paraffin or slabbed paraffin alone with hydrogenated pentacyclopentadiene.

Mixtures of various paraffins and waxes of natural and synthetic source with hydrogenated pentacyclopentadiene were produced and analyzed for softening points and melting ranges. The results are shown in the following tables:

TABLE 8.—MIXTURES OF HYDROGENATED PENTACYCLOPENTADIENE WITH HARD PARAFFIN BOILING ABOVE 380° C.

| Percentage of— | | Softening point, °C. | Melting range, °C. |
|---|---|---|---|
| hard paraffin | hydrogenated pentacyclopentadiene | | |
| 100 | ---- | 94 | 80–106 |
| 90 | 10 | 180 | 85–220 |
| 80 | 20 | 230 | 90–280 |
| 70 | 30 | 260 | 95–290 |

TABLE 9.—MIXTURES OF HYDROGENATED PENTACYCLOPENTADIENE WITH PETROLEUM SLAB PARAFFIN

| Percentage of— | | Softening point, °C. | Melting range, °C. |
|---|---|---|---|
| slabbed paraffin | hydrogenated pentacyclopentadiene | | |
| 100 | ---- | 54 | 45–58 |
| 90 | 10 | 180 | 52–210 |
| 80 | 20 | 230 | 55–250 |
| 70 | 30 | 260 | 58–290 |

TABLE 10.—MIXTURES OF HYDROGENATED PENTACYCLOPENTADIENE WITH OTHER NATURAL AND SYNTHETIC WAXES

| Wax | Hydrogenated pentacyclopentadiene, percent | Softening point, °C. | Melting range, °C. |
|---|---|---|---|
| 100% beeswax | ---- | 62 | 52–68 |
| 90% beeswax | 10 | 198 | 52–218 |
| 80% beeswax | 20 | 248 | 54–268 |
| 100% Carnauba wax | ---- | 81 | 78–86 |
| 90% Carnauba wax | 10 | 182 | 79–212 |
| 100% I.G. wax E | ---- | 74 | 70–84 |
| 90% I.G. wax E | 10 | 192 | 76–219 |
| 100% I.G. wax S | ---- | 76 | 73–86 |
| 90% I.G. wax S | 10 | 187 | 74–217 |
| 80% I.G. wax S | 20 | 238 | 79–260 |
| 100% wax alcohol-paraffin mixture | ---- | 91 | 78–100 |
| 90% wax alcohol-paraffin mixture | 10 | 175 | 85–200 |
| 80% wax alcohol-paraffin mixture | 20 | 245 | 88–265 |
| 100% wax acid-paraffin mixture | ---- | 92 | 81–102 |
| 90% wax acid-paraffin mixture | 10 | 178 | 85–210 |

EXAMPLE 5

*Waxes from mixtures of hydrogenated tricyclopentadiene-dimethylal and hydrogenated tetracyclopentadiene-dimethylal with wax materials*

Hydrocarbons prepared according to the preceding examples were used as the starting material for the production of waxes. Into these hydrocarbons, one or two aldehyde groups were introduced by the catalytic addition of water gas. For the production of the aldehydes, cyclopentadiene having an iodine number of 208 (theoretically 255) and a melting point of 59° C. was polymerized in accordance with Example 1. 1000 grams of the portion of tricyclopentadiene and tetracyclopentadiene recovered from the polymerization product and soluble in cold benzene and having an average molecular weight of 255, a softening point of 72° C. and a iodine number of 188 were dissolved in 1500 cc. heptane and given into a stirring autoclave together with a cobalt sulfate-magnesium sulfate solution containing 15 gms./liter of cobalt and 30 gms./liter of magnesia, as the catalyst, 50 grams ferrum reductum as polymerization inhibitor and 1 gram hydroquinone as stabilizer. Hydrogen and carbon monoxide were introduced until a pressure of 195 kg./sq. cm. was reached and the autoclave was heated to 140° C. During the reaction which proceeded with rapid gas absorption, the pressure and the temperature were maintained at these levels until 4.1 moles $CO+H_2$ per mole of the starting material, calculated as tetracyclopentadiene, had been added.

After cooling to about 30° C., the reaction product was drained and formed three layers after filtration: a heptane layer containing a part of the dialdehyde formed, a viscous layer containing the bulk of the dialdehyde, the aqueous catalyst solution.

After processing, the mono- and dialdehydes formed were mixed with the natural and synthetic wax materials mentioned in the preceding examples. The mixtures showed valuable properties chiefly with regard to the dielectric constant.

EXAMPLE 6

*Waxes from mixtures of hydrogenated tricyclopentadiene-dimethylol, hydrogenated tetracyclopentadiene-dimethylol and wax materials*

For the production of the corresponding dialcohols, the dialdehydes were diluted with methanol in a ratio of 1:1 and hydrogenated in the presence of a cobalt-thorium oxide catalyst. The analysis of the raw product showed the following values:

| | |
|---|---:|
| Hydroxyl number | [1] 330 |
| Carbonyl number | 4 |
| Iodine number | 8 |
| Neutralization number | 2 |
| Ester number | 5 |
| Pour point ° C | 83 |

[1] Calculated for hydrogenated tetracyclopentadiene-dimethylol: 342.

By mixing wax materials with alcohols produced by hydrogenation from the mono- and dialdehydes, respectively, waxes having very good properties and chiefly excellent dielectric constants were obtained.

I claim:

1. A wax comprising a member selected from the group consisting of tetracyclopentadiene methylol, tetracyclopentadiene dimethylol, tetracyclopentadiene methylal, and tetracyclopentadiene dimethylal.

2. A wax comprising tetracyclopentadiene dimethylol.

3. A wax comprising tetracyclopentadiene dimethylal.

4. A wax composition comprising a mixture of a member selected from the group consisting of polymers of cyclopentadiene containing 1–2 oxygen-containing radicals per molecule selected from the group consisting of methylol and methylal radicals, and a wax other than said polymer selected from the group consisting of hydrocarbons, acids, alcohols, and esters.

References Cited in the file of this patent
UNITED STATES PATENTS

| | | |
|---|---|---|
| 2,267,151 | Gray | Dec. 23, 1941 |
| 2,597,378 | Rogers et al. | May 20, 1952 |

UNITED STATES PATENT OFFICE
CERTIFICATE OF CORRECTION

August 4, 1959

Patent No. 2,898,316

Otto Roelen

It is hereby certified that error appears in the printed specification of the above numbered patent requiring correction and that the said Letters Patent should read as corrected below.

Column 2, line 33, for "quantitatives" read -- quantitative --; column 5, line 26, for "hydogenated" read -- hydrogenated --; column 8, line 73, for "59° C." read -- 58° C. --.

Signed and sealed this 5th day of January 1960.

(SEAL)
Attest:

KARL H. AXLINE
Attesting Officer

ROBERT C. WATSON
Commissioner of Patents